Figure 1A:
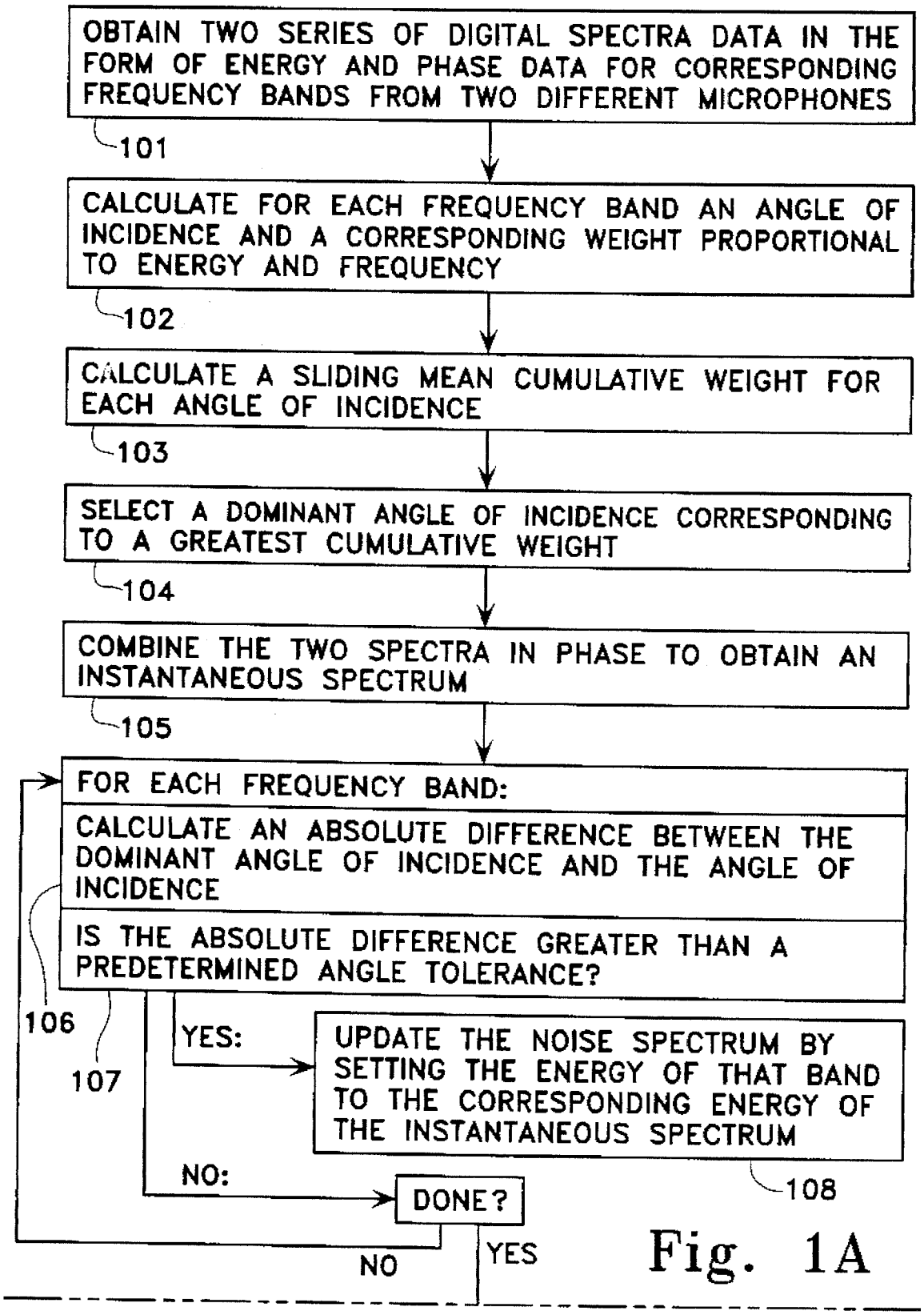

United States Patent [19]
Robbe et al.

[11] Patent Number: 5,539,859
[45] Date of Patent: Jul. 23, 1996

[54] METHOD OF USING A DOMINANT ANGLE OF INCIDENCE TO REDUCE ACOUSTIC NOISE IN A SPEECH SIGNAL

[75] Inventors: François Robbe, Herblay; Luc Dartois, Carrieres Sous Poissy, both of France

[73] Assignee: Alcatel N.V., Amsterdam, Netherlands

[21] Appl. No.: 17,780

[22] Filed: Feb. 16, 1993

[30] Foreign Application Priority Data

Feb. 18, 1992 [FR] France .................... 92 01819

[51] Int. Cl.⁶ ........................................... G10L 9/00
[52] U.S. Cl. ..................... 395/2.42; 395/2.35; 395/2.36
[58] Field of Search ................... 395/2, 2.1, 2.35–2.37, 395/2.4, 2.42; 381/41, 46, 47, 71, 94

[56] References Cited

U.S. PATENT DOCUMENTS

| | | | |
|---|---|---|---|
| 4,112,430 | 9/1978 | Ladstatter | 343/100 |
| 4,333,170 | 6/1982 | Mathews et al. | 367/125 |
| 4,653,102 | 3/1987 | Hansen | 381/92 |
| 4,912,767 | 3/1990 | Chang | 395/2.42 |
| 4,918,732 | 4/1990 | Gerson et al. | 381/46 |
| 4,932,063 | 6/1990 | Nakamura | 381/94 |
| 5,208,864 | 5/1993 | Kaneda | 381/47 |
| 5,212,764 | 5/1993 | Ariyoshi | 381/46 |
| 5,214,707 | 5/1993 | Fujimoto et al. | 381/46 |
| 5,293,450 | 3/1994 | Kane et al. | 395/2.42 |
| 5,319,736 | 6/1994 | Hunt | 395/2.36 |
| 5,390,280 | 2/1995 | Kato et al. | 395/2.35 |
| 5,400,409 | 3/1995 | Linhard | 381/47 |

OTHER PUBLICATIONS

Boll, "Suppression of Acoustic Noise in Speech Using Spectral Subtraction," *1993 IEEE Trans. on Acoustics, Speech, and Signal Processing*, 27(2): 113–20 Apr. 1979.

G. Audisio et al., "Noisy Speech Enhancement: a comparative analysis of three different techniques", *Alta Frequena*, 1 May 1984, pp. 190–195.

D. Degan, et al., "Acoustic Noise Aanylsis and Speech Enhancement Techniques for Mobile Radio Applications", *Signal Processing*, Jul. 1988, pp. 43–56, 15(1).

*Primary Examiner*—Allen R. MacDonald
*Assistant Examiner*—Michael A. Sartori
*Attorney, Agent, or Firm*—Robbins, Berliner & Carson

[57] ABSTRACT

Fourier transform processing is applied to digital signals obtained by analog-to-digital conversion of signals supplied by two microphones spaced by a fixed distance to produce two series of discrete data each datum of which represents the energy and phase of a spectral frequency band of the received sound. A dominant angle of incidence representing the angle of incidence of a speech signal component of the received sound signal relative to the two microphones is determined from phase differences between the discrete data in the same frequency bands of the two series and is used to combined the two series of discrete data into a single instantaneous spectrum in which any speech signal component is amplified relative to the noise. A noise spectrum is updated by comparing for each frequency band of the instantaneous spectrum the absolute value of the difference between the dominant angle of incidence and the angle of incidence of the frequency band in question with a tolerance threshold, and setting the energy of the noise spectrum equal to that of the instantaneous spectrum if that difference is above the tolerance threshold. The updated noise spectrum is then subtracted from the instantaneous spectrum to obtain an output spectrum consisting of the speech spectrum.

10 Claims, 4 Drawing Sheets

METHOD OF USING A DOMINANT ANGLE OF INCIDENCE TO REDUCE ACOUSTIC NOISE IN A SPEECH SIGNAL

BACKGROUND OF THE INVENTION

1. Field of the Invention

The field of the invention is that of methods for reducing acoustic noise in a speech signal.

2. Description of the Prior Art

When sound is recorded in or transmitted from a noisy environment it is advantageous to eliminate the background noise so that this is not recorded or transmitted by the means for recording or transmitting the sound signal. The latter situation is encountered in the field of mobile radiotelephones where it is desirable to avoid transmitting the background noise, for example the engine noise of a vehicle in which a radiotelephone is used, to the recipient of the speech signal.

The article "Acoustic noise analysis and speech enhancement techniques for mobile radio applications" by DAL DEGAN and PRATI, Elsevier Science Publishers B. V., Signal Processing 15, 1988, pages 43 through 56 describes and compares various techniques for processing noise in a speech signal from an automobile vehicle.

According to this article, there are known signal processing methods which estimate the background noise spectrum and subtract this noise spectrum from the spectrum of the measured signal produced by a microphone. This method based on the principle of noise cancellation by spectral subtraction is also described in the article "Suppression of acoustic noise in speech using spectral subtraction" by S. F. BOLL, IEEE Trans. ASSP. Vol. ASSP-27, 1979, pages 113 through 120.

However, the main drawback of this method is that the noise spectrum must be updated frequently to allow for changes in the background noise and this can only be done when the user is not speaking, i.e. during periods of silence. Thus in an environment in which the background noise varies frequently and significantly, and in particular in an automobile vehicle, numerous periods of silence are required for frequent updating of the background noise spectrum. Periods of silence which are sufficiently long for updating the noise spectrum are not always available and if the gaps between periods of silence are too long the noise spectrum is degraded and can no longer be used to compensate for noises of short duration. This degrades the quality of the speech signals transmitted.

One object of the present invention is to alleviate these drawbacks.

To be more precise, one object of the invention is to provide a sound signal processing method enabling background noise to be attenuated significantly and the quality of a transmitted speech signal to be improved accordingly, the noise being attenuated using a noise spectrum which is updated without requiring periods of silence by the speaker.

SUMMARY OF THE INVENTION

The invention consists in a method of reducing acoustic noise in a received sound signal incorporating a speech signal by subtracting spectral components of noise from said received sound signal to reconstitute the spectrum of said speech signal, said method comprising the steps of:

applying Fourier transform processing to digital signals obtained by analog-to-digital conversion of signals supplied by two microphones spaced by a fixed distance and receiving said sound signal to produce two series of discrete data each discrete datum of which represents the energy and phase of a frequency band of the spectrum of said sound signal, said frequency bands being adjacent and therefore representative of said spectrum of said received sound signal;

determining the dominant angle of incidence of said received sound signal from phase differences between the discrete data representing the same frequency bands of said series, said dominant angle of incidence representing the angle of incidence of said speech signal;

obtaining an instantaneous spectrum of said received sound signal corresponding to one of said series of discrete data or obtained by combining said discrete series in order to amplify said speech signal relative to said noise;

updating a noise spectrum by comparing for each frequency band of said instantaneous spectrum the absolute value of the difference between said dominant angle of incidence and the angle of incidence of the frequency band in question with a tolerance threshold value, said noise spectrum comprising the same frequency bands as said instantaneous spectrum, the energies of said frequency bands of said noise spectrum being updated using the energies of the frequency bands of said instantaneous spectrum for which the absolute value of the difference between said dominant angle of incidence and the angle of incidence of said frequency bands is greater than said tolerance threshold value; and subtracting said updated noise spectrum from said instantaneous spectrum to obtain an output spectrum consisting of said spectrum of said speech signal.

The theory of this method is therefore based on evaluating a dominant angle of incidence representing the position of the speaker relative to two microphones receiving the sound signal in order to extract the speech signal from the noise signal by spectral subtraction.

The method advantageously further comprises a stage of correcting said updated noise spectrum on the basis of the result of said subtraction.

Said updated noise spectrum is preferably corrected by counting, following said subtraction, the number of frequency bands in which the energy is above an energy threshold value and replacing said updated noise spectrum by the totality of said instantaneous spectrum if the number of said frequency bands in which the energy is above said energy threshold value is less than a predetermined value.

The energies of the discrete data of the result of said subtraction greater than said energy threshold value are advantageously forced to zero before said result replaces said output spectrum.

This eliminates signals conveying high-amplitude noise in the output spectrum.

In a further embodiment said updated noise spectrum is preferably corrected by counting, following said subtraction, the number of frequency bands in which the energy is greater than said energy threshold value and replacing the bands of said updated noise spectrum by the bands of said instantaneous spectrum producing a negative result after said subtraction if the number of frequency bands whose energy is greater than said energy threshold value is greater than said predetermined value.

In a preferred embodiment said dominant angle of incidence is determined by adding in memory locations for each of said frequency bands weightings proportional to the energy of said frequency bands, each memory location representing a range of angles of incidence, said weights being added in the memory locations corresponding to the angles of incidence of said frequency bands, said dominant angle of incidence corresponding to the angle of incidence assigned to the memory location of greatest weight.

The dominant angle of incidence representing the position of the speaker relative to the two microphones if the speaker is producing a speech signal is determined by this means.

Said weights are advantageously also proportional to the frequencies of said frequency bands and said adding consists in calculating sliding means.

In a preferred embodiment said discrete series are combined to amplify said speech signal relative to said noise by:
    eliminating phase differences between said discrete data of one of said series and those of the other of said series on the basis of said dominant angle of incidence so as to eliminate phase differences between the discrete data of said series whose angle of incidence corresponds to said dominant angle of incidence; and
    adding said discrete data of said series when in phase in order to amplify the discrete data representing said speech signal relative to the discrete data representing said acoustic noise.

The method of the invention is preferably applied to processing a speech signal in a radiotelephone.

Other features and advantages of the invention will emerge from the following description of a preferred embodiment of the method in accordance with the invention given by way of non-limiting illustrative example only with reference to the appended single figure which is a block diagram of a device in which the method is implemented.

The method of the present invention can be broken down into seven consecutive stages each of which is described in more detail later:
    a first stage of signal processing consists in digitizing the signals supplied by two fixed microphones and deriving the Fourier transforms of the digitized signals to obtain two series of discrete data, each discrete datum of a series representing the energy and the phase of a given frequency band of the spectrum of the sound signal received by the two microphones;
    a second stage of processing consists in determining the angle of incidence of the signal picked up by the two fixed microphones from phase differences between two identical frequency bands of the discrete series; knowing this angle of incidence it is possible to determine the position of the speaker relative to the two microphones;
    a third processing stage consists in recombining in phase the speech signals supplied by the two fixed microphones to amplify the speech signal relative to the noise;
    a fourth processing stage consists in updating the noise spectrum on the basis of the speech signal angle of incidence;
    a fifth processing stage consists in subtracting the noise spectrum from the instantaneous measured spectrum to obtain an output spectrum;
    a sixth processing stage consists in correcting the noise spectrum on the basis of the result of this subtraction;
    a seventh and final processing stage consists in reconstructing the output signal to enable it to be transmitted, for example (radiotelephone application).

Figure 1B:
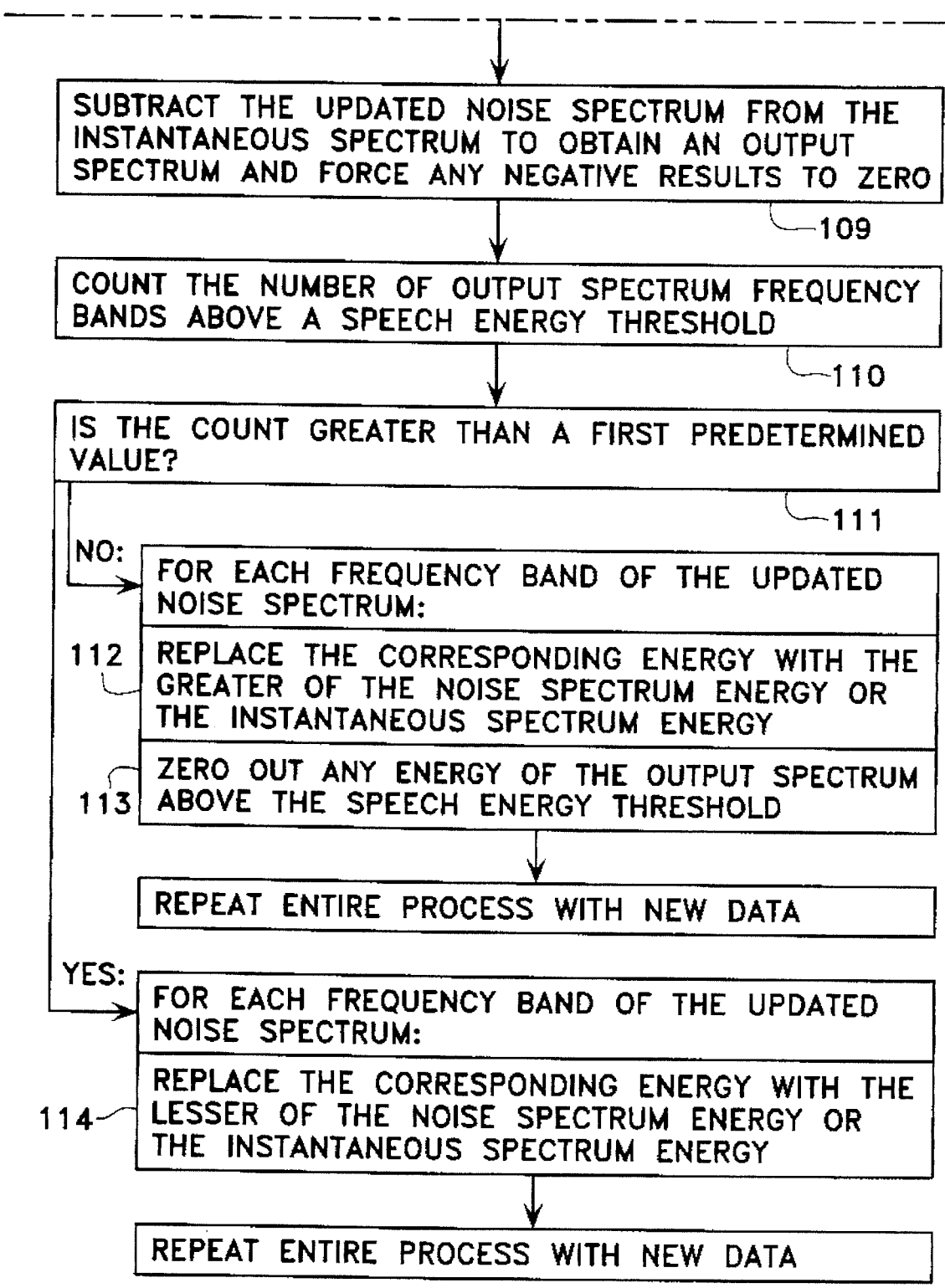

As shown in FIG. 1 of the accompanying drawings, the stage (101) of signal processing consists in digitizing the analog signals supplied by two microphones and deriving the Fourier transforms of these digital signals to obtain two series of discrete data.

Figure 2:
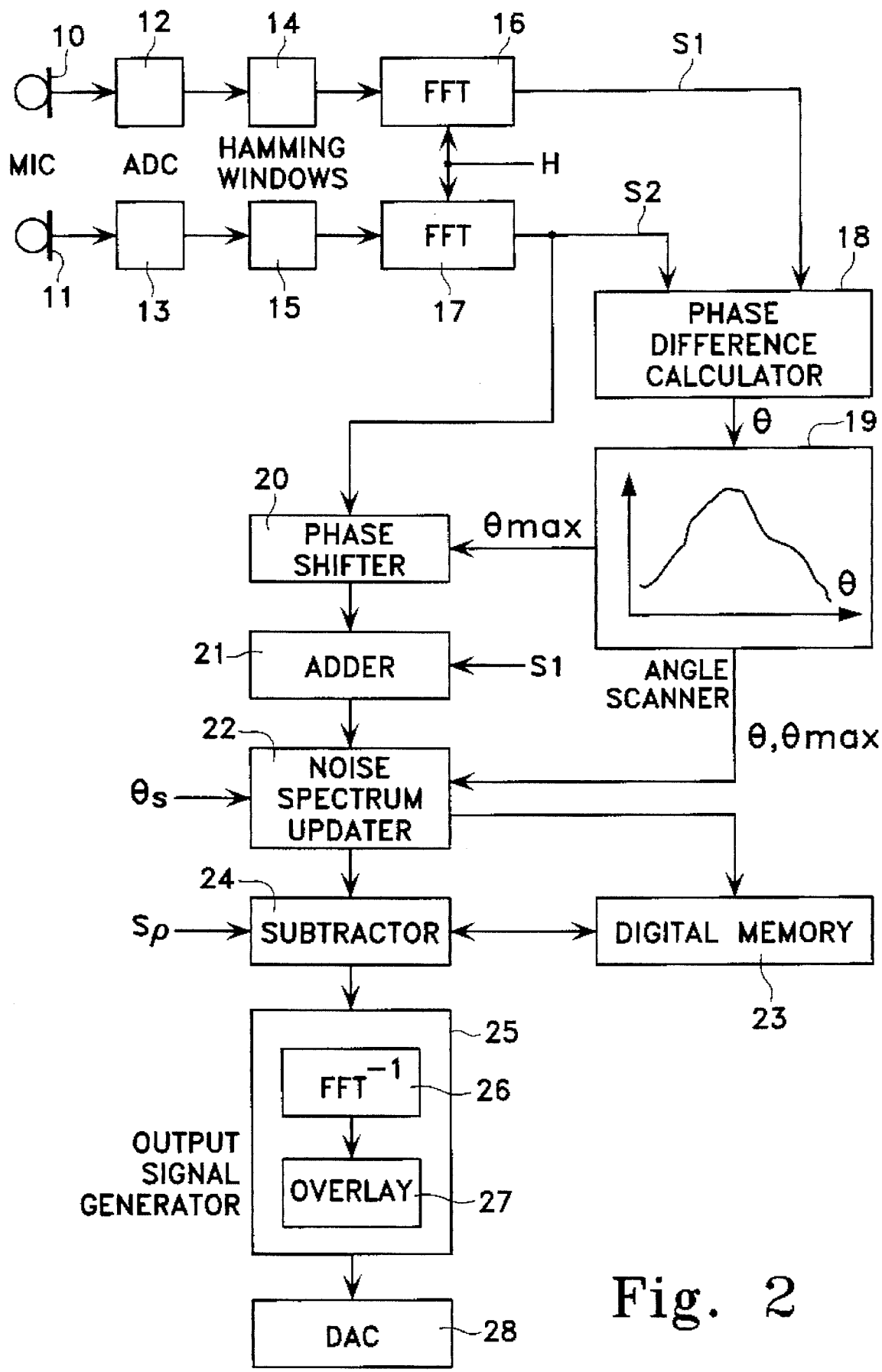

Referring to FIG. 2, the microphones 10 and 11 form an acoustic antenna. Both are fixed and the device implementing the invention is thus preferentially applicable to a "hands free" system. The analog signals from the microphones 10 and 11 are applied to analog-to-digital converters 12 and 13 which also filter the signals (frequency band 300–3 400 Hz). The digitized signals are then input to Hamming windows 14, 15 in digital form and then converted to digital vectors by devices 16, 17 for calculating nth order fast Fourier transforms (FFT).

Each analog-to-digital converter 12 and 13 supplies 256 digitized values sequentially to an output buffer (not shown) comprising 512 memory locations. At a time t the buffer supplies 512 digitized values to a Hamming window. These 512 digitized values comprise the 256 values calculated at time t placed after 256 other values calculated at time (t−1). Each Hamming window 14 and 15 attenuates secondary lobes of the received signal so that the FFT devices 16 and 17 can increase the resolution of the signal. Each of the windows 14 and 15 applies 512 digitized values to one of the devices 16 and 17. Each of these supplies a series of 512 frequency bands equally dividing the range of frequencies from 0 through 8 kHz. Each frequency band is therefore just over 15 Hz wide. The FFT calculator devices 14 and 15 use a timing clock H.

This clock could be replaced by a device for counting the number of samples supplied by the FFT devices 14 and 15 and reset to zero when 512 processing cycles are completed.

The results S1 and S2 of the above calculations therefore comprise a succession of vectors in digital form each representing a sample of the spectrum of one of the input signals and comprising, for example, two words each of 16 bits defining a complex number.

In reality only 256 different vectors can be processed given that in the case of a real signal (in the mathematical sense) the modulus of the Fourier transform is an even function whereas the phase is odd. The remaining 256 vectors are ignored. At the output of the FFT devices each band therefore supplies 256 vectors each comprising two words each of 16 bits.

The second processing stage (102) consists in determining the angle of incidence of the signal picked up by the two fixed microphones on the basis of phase differences between two identical frequency bands of the discrete series.

The vectors from the FFT devices are supplied in succession to a device 18 for calculating the phase shift between the signals from the microphones 10 and 11. The series S1 and S2 are respectively characterized by identical frequency bands having phases $\phi 1$ and $\phi 2$ and different moduli if the sound signal impinging on the microphone 10 is not strictly identical to that impinging on the microphone 11 (signal phase difference due to propagation time delay).

The signals S1 and S2 therefore comprise series of vectors, each pair of vectors representing a given frequency band, and are supplied to a device 18 for calculating the phase difference between the signals S1 and S2 for each frequency band.

The distance between the two microphones is known and assuming that the sound signal approximates a plane wave, the angle of incidence of the sound signal in each frequency band can be obtained from the equation:

$$\sin\theta = \frac{v \cdot \delta\phi}{2 \cdot \pi \cdot d \cdot f}$$

where:

θ is the angle of incidence of the sound signal of the frequency band in question;

v is the speed of sound;

δφ is the phase difference between the two signals;

d is the distance between the microphones 10 and 11;

f is the frequency in Hz of the frequency band in question (the center frequency of this frequency band, for example).

The calculator device 18 calculates the phase difference between the signals from the two microphones band by band in this way.

The device 18 supplies the angles of incidence θ calculated for the various frequency bands to an angle of incidence scanner 19. The scanner 19 updates an angle of incidence bar chart comprising m bars (i.e. memory locations) covering angles from −90° through +90°. Each bar is therefore 180/m degrees wide.

The bar chart is updated (step 103) for each frequency band by adding to the bar representing an associated range containing the angle of incidence calculated by the device 18 a weighting proportional to the frequency and proportional to the energy in the band in question (amplitude of the spectral component). The weighting added is preferably proportional to the frequency because determination of the angle is more reliable at higher frequencies which are a better approximation of a plane wave and have a lower value of δf/f. The value shown by a bar is a sliding mean calculated from the equation:

$$c(n) = a \cdot c(n-1) + (1-a) \cdot weighting(n)$$

where:

c(n) is the value shown by a bar of the bar chart at time n;

a is a real number less than 1 and close to 1;

weighting(n) is the value of the weighting at time n (this value is equal to the energy of the band in question multiplied by its frequency, for example).

If there is no speech signal in the sound signal picked up by the two microphones 10 and 11 the values represented by the various bars of the bar chart (i.e. stored in the various memory locations) decrease as new data arrives so that eventually the weights of the various memory locations are substantially equal, the noise being uniformly distributed between them if it is not from a localized source such as the engine of a vehicle, for example.

The bar chart is updated in this way periodically, for example every 32 ms.

Means (not shown) inhibit updating of the bar chart if a speech signal is received by the user.

When all the frequency bands have been updated the device 19 scans the bar chart to find its maximum, i.e. the bar (memory location) with the greatest weight. The position of this memory location, i.e. the angle of incidence assigned to it, represents the dominant angle of incidence. This dominant angle of incidence $\theta_{max}$ is that at which the sound signals containing the greatest energy arrive.

If the sound signal includes speech the dominant angle of incidence $\theta_{max}$ represents the position of the speaker relative to the two microphones. The frequencies of noise from non-localized sources are distributed virtually uniformly between the various bars of the bar chart whereas speech frequencies from a localized source (the speaker) always accumulate in the same bar, causing a peak to appear rapidly in the bar chart at the bar representing the dominant angle of incidence $\theta_{max}$.

In another embodiment there are as many bar charts as there are frequency bands and the various bar charts are averaged over all bands to detect the dominant angle of incidence. This embodiment requires greater memory capacity and for this reason it is preferable to calculate sliding means for each memory location.

The angle of incidence of the speech signal may also be determined in various other ways.

The second signal processing step (104) of the method of the invention thus determines the angle of incidence $\theta_{max}$ of the speech signals.

The third stage (105) of signal processing consists in combining in phase the signals supplied by the two microphones to amplify the speech signal relative to the noise signal. This stage is implemented by means 20 for eliminating the phase difference between the two channels and means 21 for adding the channels once they are in phase.

The angle of incidence scanner 19 supplies to the phase shifter 20 the value $\theta_{max}$ of the dominant angle of incidence. The phase shifter 20 calculates for each frequency band the phase difference between the two input channels for the dominant angle $\theta_{max}$ supplied to it by the scanner 19 using the above equation with θ replaced by $\theta_{max}$:

$$\delta\phi = (2 \cdot \pi \cdot d \cdot f \cdot \sin\theta_{max})/v$$

The phase difference obtained for each frequency band is added to (or subtracted from, depending on how δ is calculated) the phase of one of the two signals. In the embodiment shown the phase difference is added to (subtracted from) S2. The phase shifter 20 thus provides a signal S2 whose frequency bands representing the speech signal are in phase with those of the signal S1 (because these frequency bands are those conveying the greatest energy, enabling $\theta_{max}$ to be determined).

The adder 21 for adding the channels once they are in phase then adds the signal S1 to the phase-shifted signal S2. By adding the signals on the two channels after they are in phase the speech signal is summed coherently to produce a high-amplitude speech signal. On the other hand, the noise signal is attenuated relative to the speech signal obtained in this way because of noise spectrum spreading (the noise signal does not come from a localized source like the speech signal). Adding the signals after they are in phase therefore amplifies the speech signal relative to the noise signal.

However, the noise rejection is generally not sufficient because there remains residual noise whose spectral components have the same angle of incidence as the speech signals. A further stage of processing is therefore required.

Note that this third stage of signal processing is optional and that one of the two signals, for example the signal S2, could be used directly for the remainder of the processing. In this case the signal at the output of the adder 21 is replaced by the signal S2.

It is also possible to use a greater number of fixed microphones. However, the use of digital signals representing frequency components of signals picked up by a plurality of microphones complicates the algorithm for calculating the angle of incidence θ for each frequency band and also the elimination of phase differences between these signals in order to enable them to be added, for example. Nor is it beneficial to use signals representing the sound signal picked up by a third microphone to replace those from the adder 21 because their angles of incidence would necessarily be different from that of the signals S1 and S2 and the dominant angle of incidence determined in this way could not allow for the signals picked up by the third microphone.

The additional processing stage constitutes the fourth stage previously referred to and consists in updating the noise spectrum. The noise spectrum is updated partly on the basis of the angle of incidence $\theta_{max}$ recognized as being that of the speech and partly from the instantaneous spectrum comprising the series of digital data supplied by the adder 21.

For each frequency band a device 22 for updating the noise spectrum compares the angle of incidence $\theta$ calculated by the calculator 18 (step 106) with the angle of incidence $\theta_{max}$ of the speech supplied to it by the scanner 19. For example, the device 22 might compare the absolute value of the difference between $\theta_{max}$ and $\theta$ for each frequency band with a tolerance threshold $\theta_S$.

If the absolute value of the difference between the two angles is above the tolerance threshold $\theta_S$ the respective frequency band is regarded (YES branch from block 107) as belonging to the noise spectrum. The energy in this band is then used (step 108) to update the noise spectrum using a sliding mean technique, for example. This updating could equally well be carried out by simply replacing some of the noise spectrum data with the respective data from the instantaneous spectrum. The noise spectrum is stored in a digital memory 23. The tolerance threshold $\theta_S$ makes it possible to allow for small variations in the position of the speaker relative to the two microphones and also for calculation inaccuracies.

If the absolute value of the difference between the two angles $\theta_{max}$ and $\theta$ is below the tolerance threshold $\theta_S$ the frequency band in question is considered to belong to the speech spectrum and its energy is therefore not used to update the noise spectrum in the memory 23.

The device 22 thus updates the noise spectrum by comparing the angle of incidence $\theta$ of each frequency band with the dominant angle of incidence $\theta_{max}$. The calculated angle $\theta_{max}$ enables selection of the frequencies of the spectrum obtained by the FFT devices. Of course, it is not essential to obtain an absolute value of the difference between the dominant angle of incidence and the angle of incidence of each frequency band of the instantaneous spectrum. For example, it is possible to delimit a range of angles of incidence of width $2\theta_S$ centered on $\theta_{max}$ and to check if the angle of incidence $\theta$ of each frequency band is in this range.

Note that the noise spectrum is updated continuously, every 32 ms, whether there is speech in the signal picked up by the two microphones 10, 11 or not. The method of the invention is therefore distinguished from the aforementioned prior art in that there is no need for periods of silence for updating the noise spectrum, the determination as to whether each frequency band belongs to the noise spectrum or the speech signal spectrum being based on the calculated dominant angle of incidence and the angle of incidence for the band in question.

The fifth stage (step 109) is to subtract the noise spectrum from the measured instantaneous spectrum.

This stage uses a device 24 for subtracting the noise spectrum from the instantaneous spectrum. The noise spectrum is read from the digital memory 23 and subtracted from the instantaneous spectrum from the device 22. If the second (amplification) stage of this method is not implemented the instantaneous spectrum comprises the vectors of one of the two signals, for example those of the signal S2.

This subtraction produces an output spectrum consisting of a speech signal spectrum almost entirely devoid of noise spectrum components. It is nevertheless possible to process further the spectrum obtained, in particular to correct the updated noise spectrum.

Following subtraction, negative results are forced to zero. Two situations may then arise:
  the instantaneous spectrum did not contain speech and so the residual spectrum contains only a small number of meaningful frequencies; or
  the instantaneous spectrum did contain speech and the residual spectrum therefore contains a large number of frequencies conveying energy essentially representing the speech spectrum.

To determine the content of the instantaneous spectrum it is therefore sufficient to count (step 110) the number of frequency bands for which the spectral power is greater than a threshold value Sp so that frequency bands conveying little energy can be ignored and therefore eliminated. These frequency bands represent either residual noise or speech frequency bands in which the energy is so low that they do not need to be transmitted to the recipient (radiotelephone application).

The value of the threshold Sp is preferably not the same for each frequency band and depends on the energy present in each of the frequency bands. For example, a first threshold value might be assigned to the bands in the range of frequencies from 0 through 2 kHz and a second threshold value equal to half the first threshold value, for example, to the frequency bands in the range of frequencies from 2 through 4 kHz. In this way it is possible to allow for the fact that the noise spectrum energies are greater at lower frequencies than at higher frequencies inside a vehicle.

If the number of frequency bands in which the energy exceeds Sp is small (below a threshold value) the frequency bands in question are regarded (NO branch from block 111) as comprising residual noise frequencies. The totality of the instantaneous spectrum (i.e. the data at the input of the device 22) is then used to update the noise spectrum. This is done in the digital memory 23 and constitutes the sixth stage of signalling processing. To be more precise, it consists in replacing (step 112) the energies of the frequency bands of the updated noise spectrum with the energies of the respective frequency bands of the instantaneous spectrum. Additionally, the frequency bands whose energy exceeds the threshold Sp are forced to zero (step 113) before replacing the frequency bands of the noise spectrum. This eliminates frequencies conveying high-amplitude noise.

In an alternative embodiment only the frequency bands of the instantaneous spectrum having energies higher than those of the respective frequency bands of the noise spectrum are used for such replacement. This allows only for frequency bands of the instantaneous spectrum containing high energy.

If the spectrum obtained after subtraction represents a speech signal (i.e. if the number of frequency bands which after subtraction contain an energy exceeding Sp is greater than the threshold value) (YES branch from block 111), only the energies of the frequency bands of the instantaneous spectrum corresponding to the frequency bands of the residual spectrum after subtraction producing a negative result are used to correct (step 114) the noise spectrum. A negative result after subtraction means that the respective frequency band of the updated noise spectrum contains too much energy. This correction prevents the residual noise spectrum (i.e. the updated spectrum) comprising only a few high-amplitude frequency bands which would make the reconstituted sound particularly uncomfortable.

Of course, the noise spectrum correction constituting this sixth stage of processing is optional and can be carried out in various ways once it is decided whether the spectrum obtained by subtraction must or must not be regarded as a spectrum containing frequency bands of speech to be processed, for example to be transmitted to a recipient.

The seventh and final stage of processing consists in constructing an analog output signal so that it can be transmitted, for example. This stage uses an output signal generator 25 comprising an inverse fast Fourier transform device (FFT$^{-1}$) 26 supplying 512 speech signal samples. The FFT$^{-1}$ device is preceded by a device (not shown) for regenerating the 256 vectors received to provide 512 vectors at the input of the FFT$^{-1}$ device. The device 26 is followed by an overlay device 27 facilitating reconstruction of the output signal. The device 27 overlays the first 256 samples received and the 256 samples it most recently received (forming part of the previous processing cycle). This compensates at the output for the application of a Hamming window at the input. A digital-to-analog converter 28 produces a low-noise sound signal ready to be transmitted to its recipient. It is equally possible to record this signal on magnetic tape, for example, or to process it in some other way.

This seventh stage may not be needed in some applications. The method of the invention could be applied to speech recognition, for example, and in this case the seventh stage of processing may be omitted since speech recognition devices use the spectral representation of a speech signal.

The method of the invention is thus able to reduce significantly the noise spectrum of a sound signal to provide a speech signal without requiring periods of silence by the speaker to update the noise spectrum since the signal angle of incidence is used to distinguish between noise and speech.

There is claimed:

1. Method of reducing acoustic noise in a received sound signal incorporating a speech signal by subtracting spectral components of noise from said received sound signal to reconstitute a speech signal spectrum, said method comprising the steps of:

applying Fourier transform processing to digital signals obtained by analog-to-digital conversion of signals supplied by two microphones spaced by a fixed distance and receiving said sound signal to produce two series of discrete data each discrete datum of which being associated with a respective frequency band of the spectrum of said sound signal and representing the energy magnitude and phase of said respective frequency band, said each of said two series being representative of both noise and speech components of said received sound signal spectrum, each individual difference in phase between the data of the two series associated with the same frequency band representing a respective individual angle of incidence of a respective portion of the received sound signal;

determining a single dominant angle of incidence of said received sound signal from a plurality of the individual angles of incidence, said dominant angle of incidence representing an assumed angle of incidence of said speech signal;

combining said two series to thereby obtain a single instantaneous spectrum of said received sound signal;

for each frequency band of said instantaneous spectrum, comparing a respective tolerance threshold value with a respective absolute value of a respective difference between said dominant angle of incidence and said respective angle of incidence, forming a noise spectrum comprising the same frequency bands as the frequency bands of the instantaneous spectrum, updating the noise spectrum with the energy magnitude data associated with those frequency bands of the instantaneous spectrum for which the respective absolute value is greater than said respective tolerance threshold value to thereby form an updated noise spectrum; and subtracting said updated noise spectrum from said instantaneous spectrum to obtain an output spectrum approximating said speech signal spectrum.

2. Method according to claim 1 further comprising the step of correcting said updated noise spectrum on the basis of the result of said subtraction to thereby form a corrected noise spectrum.

3. Method according to claim 2 wherein said updated noise spectrum is corrected by counting, following said subtraction, the number of frequency bands of the output spectrum in which the respective energy magnitude is above an energy threshold value, and if said number is less than a predetermined value, replacing the energy magnitude data in all of the frequency bands of said corrected noise spectrum for which said magnitude is below said threshold value with the corresponding energy data from the instantaneous spectrum.

4. Method according to claim 3, further comprising the step of forcing to zero the respective energy magnitude data of those frequency bands which are above said energy threshold value.

5. Method according to claim 2 wherein said updated noise spectrum is corrected by counting, following said subtraction, the number of frequency bands in which the energy is greater than an energy threshold value and by using the energy of each band of said instantaneous spectrum producing a negative result after said subtraction to replace the energy of a respective band of said updated noise spectrum if said number is greater than a predetermined value.

6. Method according to claim 1 wherein said dominant angle of incidence is determined by adding in memory locations for each of said frequency bands weightings proportional to the energy of said frequency bands, each memory location representing a range of angle of incidence, said weightings being added in the memory locations corresponding to the angles of incidence of said frequency bands, said dominant angle of incidence corresponding to the angle of incidence assigned to the memory location of greatest weight.

7. Method according to claim 6 wherein said weightings are also proportional to the frequencies of said frequency bands.

8. Method according to claim 6 wherein said adding step is performed by calculating sliding mean.

9. Method according to claim 1 wherein said combining step includes the further steps of:

introducing a phase correction derived from the dominant angle of incidence in the two series of discrete data; and adding said discrete data of the two series when in phase, whereby the discrete data representing said speech signal are amplified relative to the discrete data representing said acoustic noise.

10. Method of reducing acoustic noise in a received sound signal comprising a speech signal and a noise signal comprising the steps of:

determining a respective sound signal spectrum from each of two sources, each said spectrum including a plurality of adjacent frequency bands and a respective energy for each frequency band;

calculating a respective angle of incidence for each frequency band representative of a respective phase difference of the two sources within the respective frequency band;

calculating an individual weighting for each frequency band proportional to the energy and frequency of the two signal spectra within the respective frequency band;

establishing a plurality of disjoint ranges of angle of incidence;

for each range of said disjoint ranges, calculating a sliding mean of a sum of the individual weightings of those frequency bands whose angle of incidence is within the respective range, to thereby establish a respective cumulative weighting;

identifying a greatest cumulative weighting;

selecting a dominant angle of incidence within the respective range corresponding to said greatest cumulative weighting;

setting a relative phase between the two spectra equal to said dominant angle of incidence to thereby obtain two phase adjusted series of discrete data;

adding the respective discrete data of the two phase adjusted series to obtain an amplified instantaneous spectrum incorporating both said sound signal and said noise signal;

calculating for each frequency band of said instantaneous spectrum a respective absolute value of a difference between said dominant angle of incidence and the respective angle of incidence of the frequency band;

comparing each said absolute value with a tolerance threshold value;

obtaining an updated noise spectrum from the instantaneous spectrum, each frequency band of said updated noise spectrum having an energy equal to a corresponding value of the instantaneous spectrum if the respective absolute value is greater than said tolerance threshold value;

subtracting said updated noise spectrum from said instantaneous spectrum to obtain an output spectrum comprising a corresponding spectrum of said speech signal;

counting, following said subtraction, the number of frequency bands in which the energy of the output spectrum is above an energy threshold value;

if said number is greater than a predetermined value indicative of said output spectrum containing a large number of meaningful data and being essentially representative of said speech signal, setting the energy of each band of a corrected noise spectrum to the lessor of the energy of the respective frequency band of said instantaneous spectrum or the energy of said updated noise spectrum; and if said number is not greater than said predetermined value and said output spectrum does not contain said large number of meaningful data and said instantaneous spectrum is therefore essentially representative of said noise signal, setting to zero the energy of those frequency bands of said output spectrum for which the respective energy is above said energy threshold value and replacing the energy of at least the corresponding frequency bands of said corrected noise spectrum with the respective energies of the instantaneous spectrum.

* * * * *